US011079547B2

(12) United States Patent
Trita et al.

(10) Patent No.: US 11,079,547 B2
(45) Date of Patent: Aug. 3, 2021

(54) BROADBAND STAR COUPLER

(71) Applicant: ROCKLEY PHOTONICS LIMITED, London (GB)

(72) Inventors: Andrea Trita, Pasadena, CA (US); Thomas Pierre Schrans, Temple City, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 16/104,083

(22) Filed: Aug. 16, 2018

(65) Prior Publication Data

US 2019/0056551 A1 Feb. 21, 2019

Related U.S. Application Data

(60) Provisional application No. 62/547,009, filed on Aug. 17, 2017.

(51) Int. Cl.
*G02B 6/28* (2006.01)
*G02B 6/12* (2006.01)
*G02B 6/293* (2006.01)

(52) U.S. Cl.
CPC ....... *G02B 6/2804* (2013.01); *G02B 6/12016* (2013.01); *G02B 6/2808* (2013.01); *G02B 6/29308* (2013.01); *G02B 6/2931* (2013.01); *G02B 6/29301* (2013.01)

(58) Field of Classification Search
None
See application file for complete search history.

(56) References Cited

U.S. PATENT DOCUMENTS

| 5,894,535 | A | * | 4/1999 | Lemoff | G02B 6/125 |
| | | | | | 385/14 |
| 5,926,298 | A | | 7/1999 | Li | |
| 6,735,363 | B1 | | 5/2004 | McGreer et al. | |
| 2002/0081061 | A1 | * | 6/2002 | He | G02B 6/12007 |
| | | | | | 385/24 |
| 2006/0188196 | A1 | * | 8/2006 | Charters | G02B 6/122 |
| | | | | | 385/33 |
| 2017/0017043 | A1 | * | 1/2017 | Menard | G02B 6/12007 |
| 2017/0048016 | A1 | * | 2/2017 | Li | G02B 6/00 |
| 2017/0102270 | A1 | * | 4/2017 | Ho | G01J 3/0256 |

FOREIGN PATENT DOCUMENTS

| JP | 3048039 B2 | 6/2000 |
| WO | WO 02/073270 A1 | 9/2002 |
| WO | WO 2015/084332 A1 | 6/2015 |

OTHER PUBLICATIONS

International Search Report and Written Opinion of the International Searching Authority, dated Nov. 14, 2018, Corresponding to PCT/EP2018/072243, 13 pages.

* cited by examiner

*Primary Examiner* — Chris H Chu
(74) *Attorney, Agent, or Firm* — Lewis Roca Rothgerber Christie LLP (57) ABSTRACT

An optical device. In some embodiments, the optical device includes a first interface; a second interface; a first plurality of waveguides, at the first interface; a second plurality of waveguides, at the second interface; and a free propagation region. A first waveguide of the first plurality of waveguides has a width at least 20% greater than a second waveguide of the first plurality of waveguides.

7 Claims, 13 Drawing Sheets

BROADBAND STAR COUPLER

CROSS-REFERENCE TO RELATED APPLICATION(S)

The present application claims priority to and the benefit of U.S. Provisional Application No. 62/547,009, filed Aug. 17, 2017, entitled "BROADBAND STAR COUPLER", the entire content of which is incorporated herein by reference.

FIELD

One or more aspects of embodiments according to the present invention relate to star couplers.

BACKGROUND

Star couplers, when used with broadband light, may exhibit wavelength-dependent behavior that may result in a degradation in system performance. Thus, there is a need for an improved star coupler.

SUMMARY

According to an embodiment of the present invention there is provided an optical device, comprising: a first interface; a second interface; a first plurality of waveguides, at the first interface; one or more second waveguides, at the second interface; and a free propagation region connecting the first plurality of waveguides and the one or more second waveguides, a first waveguide, of the first plurality of waveguides, having a first width a second waveguide, of the of the first plurality of waveguides, having a second width, the first width being at least 5% greater than the second width.

In some embodiments, the optical device is a star coupler, the first interface is a first aperture of the star coupler, and the second interface is a second aperture of the star coupler.

In some embodiments, the optical device is an echelle grating.

According to an embodiment of the present invention there is provided a wavelength-selective element, comprising: an optical device, the wavelength-selective element being configured to: receive light at a first wavelength, direct the light at the first wavelength to the first waveguide, receive light at a second wavelength, and direct the light at the second wavelength to the second waveguide.

In some embodiments, the ratio of the first width to the second width is within 10% of the ratio of the first wavelength to the second wavelength.

In some embodiments, the wavelength-selective element is an arrayed waveguide grating.

In some embodiments: the optical device is a star coupler, the first interface is a first aperture of the star coupler, and the second interface is a second aperture of the star coupler.

In some embodiments, the ratio of the first width to the second width is within 10% of the ratio of the first wavelength to the second wavelength.

In some embodiments, the width of the first waveguide is selected such that a first field pattern, at the second aperture, corresponding to a fundamental mode of the first waveguide, includes, within a range of angles subtended by the second aperture, at least 99% of the power of the first field pattern.

In some embodiments, the width of the second waveguide is selected such that a second field pattern, at the second aperture, corresponding to a fundamental mode of the second waveguide, includes, within a range of angles subtended by the second aperture, at least 99% of the power of the second field pattern.

In some embodiments, the optical device is a star coupler, the first interface is a first aperture of the star coupler, the second interface is a second aperture of the star coupler, and a trench between the first waveguide and a waveguide, of the first plurality of waveguides, adjacent to the first waveguide has a width less than 1 micron.

In some embodiments, the width of the trench is less than 700 nm.

In some embodiments, each trench between a pair of adjacent waveguides at the first aperture has a has a width less than 1 micron.

In some embodiments, each trench between a pair of adjacent waveguides at the first aperture has a has a width less than 700 nm.

According to an embodiment of the present invention there is provided a wavelength-selective element, comprising: an optical device, the wavelength-selective element being configured to: receive light at a first wavelength, direct the light at the first wavelength to the first waveguide, receive light at a second wavelength, and direct the light at the second wavelength to the second waveguide.

In some embodiments, the wavelength-selective element is an arrayed waveguide grating.

In some embodiments, the wavelength-selective element is an arrayed waveguide grating having one port waveguide at a first interface of the arrayed waveguide grating and a plurality of port waveguides at a second interface of the arrayed waveguide grating, the arrayed waveguide grating comprises a first star coupler connected to the port waveguide at the first interface of the arrayed waveguide grating, and the optical device is connected to the plurality of port waveguides at the second interface of the arrayed waveguide grating.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a broadband star coupler provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
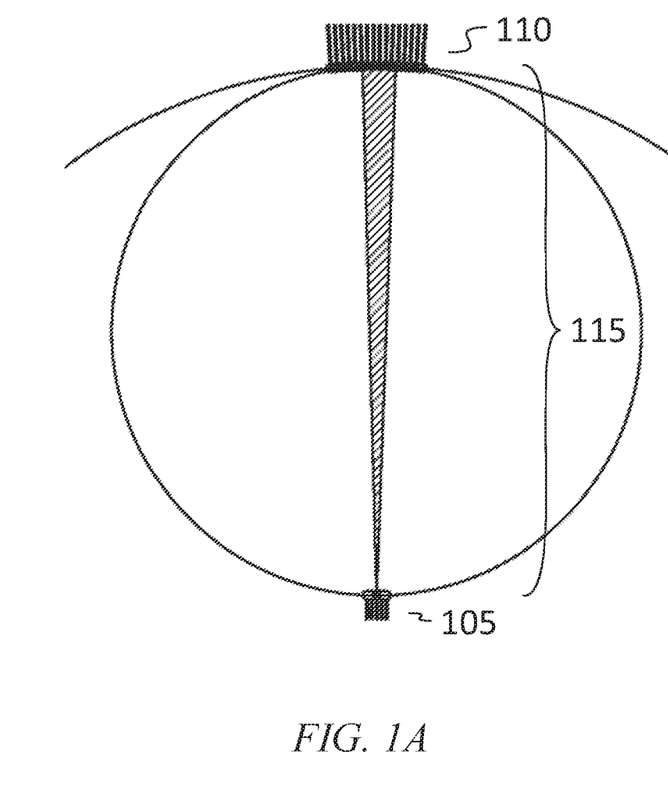
FIG. 1A is a schematic drawing of a star coupler, according to an embodiment of the present disclosure.
Figure 1B:
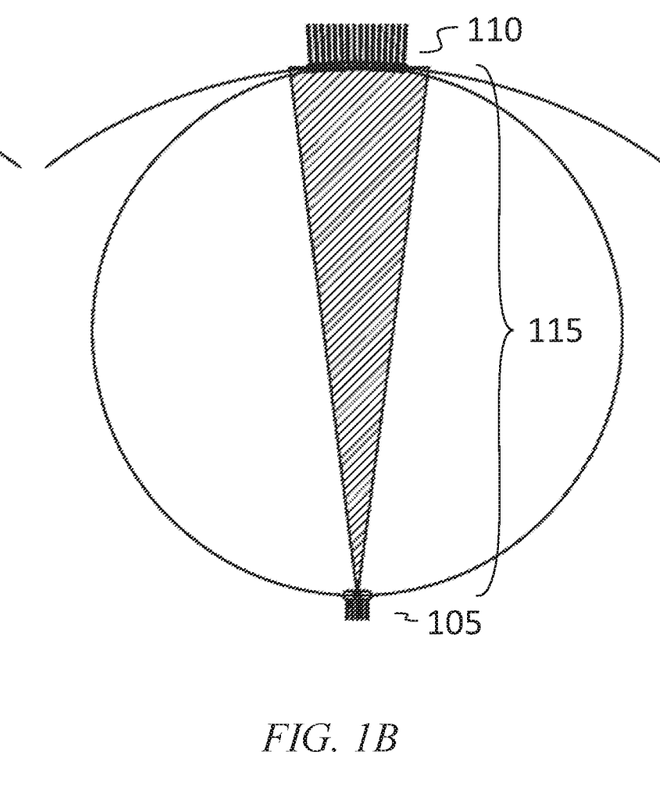
FIG. 1B is a schematic drawing of a star coupler, according to an embodiment of the present disclosure.

Referring to FIGS. 1A and 1B, a star coupler may include an array of first waveguides 105 and an array of second waveguides 110 separated by a free propagation region 115. Each of the first waveguides 105 and second waveguides 110 may be a rib waveguide (fabricated, for example on a silicon photonics (e.g., silicon-on-insulator) chip), and the free propagation region 115 may be a slab region on the chip.

The star coupler may be reciprocal device, i.e., the loss and delay experienced by light propagating through the device from one of the first waveguides 105 to one of the second waveguides 110 may be the same as the loss and delay experienced by light propagating in the opposite direction, through the same two waveguides. The star coupler may be operated with one of the first waveguides 105 being an input waveguide (e.g., a transmitting waveguide, transmitting light into the free propagation region 115) and the second waveguides 110 being output waveguides (e.g., receiving waveguides) (as shown in FIGS. 1A and 1B), i.e., with light travelling upward in the view of FIGS. 1A and 1B, or it may instead be operated with the second waveguides 110 being input waveguides (e.g., transmitting waveguides) and one of the first waveguides 105 being an output waveguide (e.g., a receiving waveguide). FIGS. 1A and 1B show that light transmitted by one of the first waveguides may have a smaller divergence angle for a shorter wavelength (e.g., 1500 nm, as shown in FIG. 1A) than for a longer wavelength (e.g., 2500 nm, as shown in FIG. 1B). This may result in higher loss for light at 2500 nm than at 1500 nm, for coupling, for example, from one of the first waveguides 105 near the middle of the array of first waveguides 105 to one of the second waveguides 110 near the middle of the array of second waveguides 110. The star coupler may be reciprocal so that the loss for light travelling in the opposite direction, from the one of the second waveguides 110 near the middle of the array of second waveguides 110 to the one of the first waveguides 105 near the middle of the array of first waveguides 105 may be the same.

Figure 2:
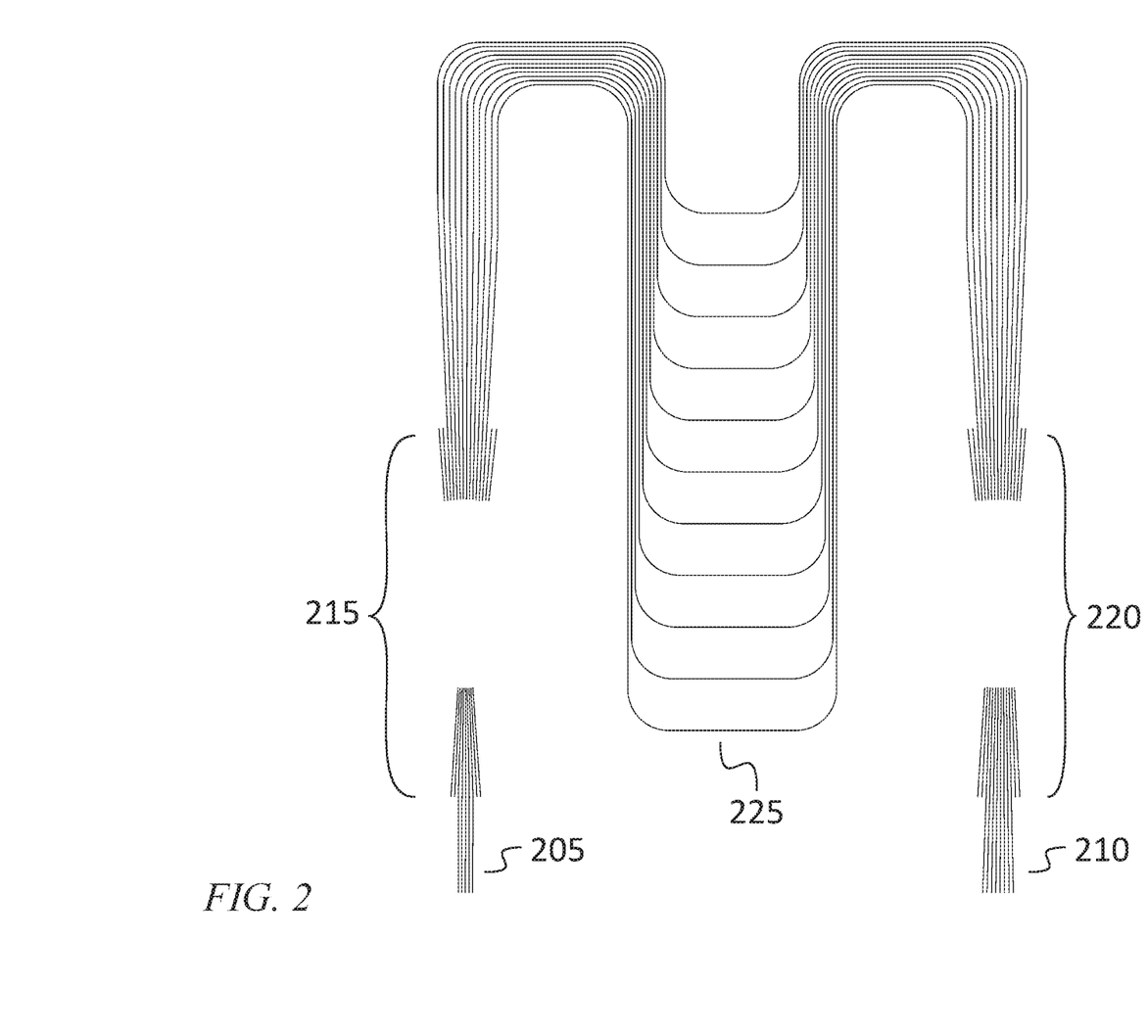
FIG. 2 is a schematic drawing of an arrayed waveguide grating, according to an embodiment of the present disclosure.

FIG. 2 shows a 5×11 AWG having a first plurality of port waveguides (e.g., input waveguides) at a first interface 205, a second plurality of port waveguides (e.g., output waveguides) at a second interface 210, a first star coupler 215 connected to the a first plurality of port waveguides, a second star coupler 220 connected to the a second plurality of port waveguides, and an array 225 of waveguides connecting the first star coupler 215 to the second star coupler 220. A 1×16 AWG may be like the 5×11 AWG of FIG. 2, but may have only one waveguide at a first interface 205 of the AWG and may have 16 waveguides (instead of the 11 shown in FIG. 2) at a second interface 210 of the AWG. The effects of wavelength-dependent behavior in star couplers may result in a 1×16 arrayed waveguide grating (AWG) having wavelength-dependent loss, which may, for example, be 0.9 dB greater at a first wavelength (e.g., at 2264 nm) than at a second wavelength (e.g., at 1636 nm). As may be seen from FIG. 2, in some embodiments some of the waveguides of a star coupler are unused, i.e., not connected to other optical elements. Such unused waveguides, which may be referred to as "dummy waveguides", may help to ensure that if the mode shape of each waveguide is affected by the presence of adjacent waveguides, the mode shapes of the waveguides that are used (i.e., the mode shapes of the waveguides that are not dummy waveguides) are nonetheless similar to an acceptable extent. The AWG may be a reciprocal device, so that the loss in one channel in one direction may be the same as the loss in the same channel in the opposite direction. The AWG may be a wavelength-selective element. As used herein, a "wavelength selective element" is an optical element that directs light based on, or based in part on, its wavelength.

Figure 3A:
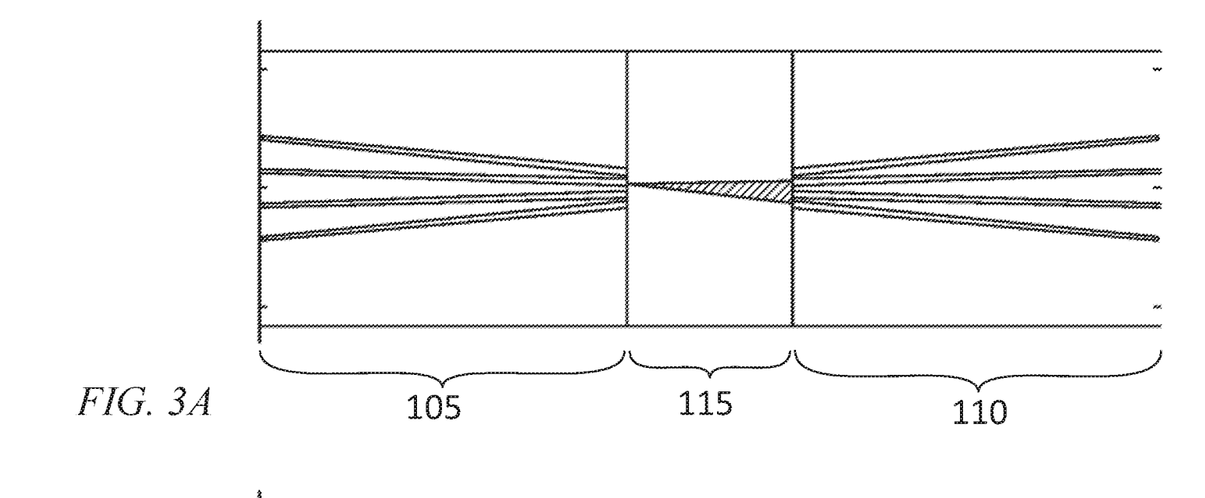
FIG. 3A is a schematic drawing of a star coupler, according to an embodiment of the present disclosure.
Figure 3B:
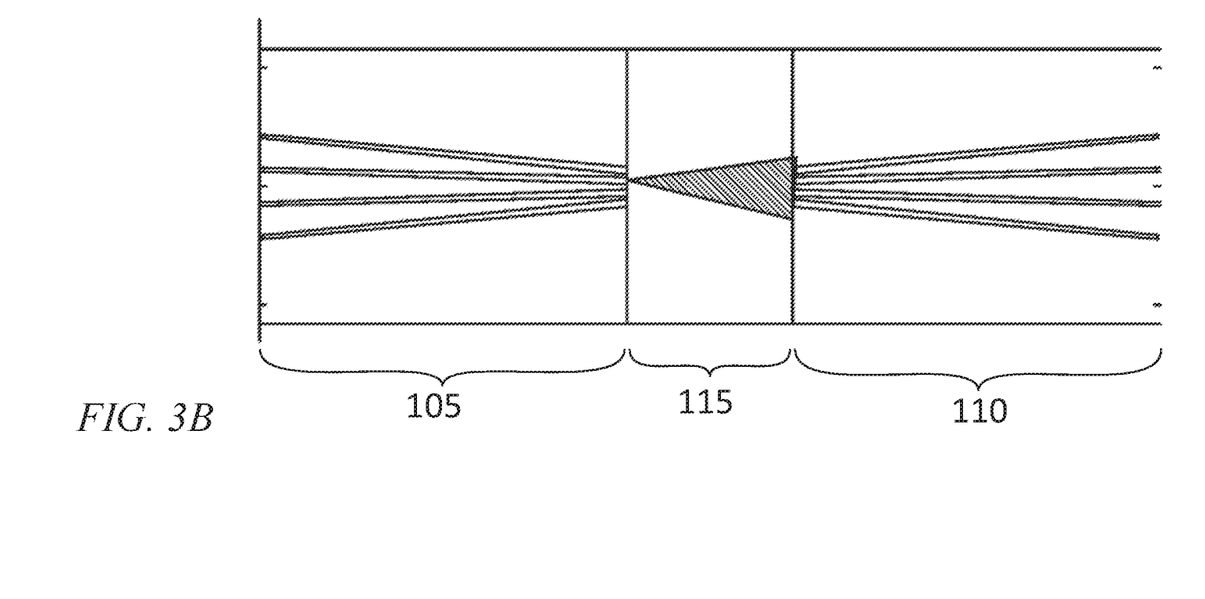
FIG. 3B is a schematic drawing of a star coupler, according to an embodiment of the present disclosure.
Figure 3C:
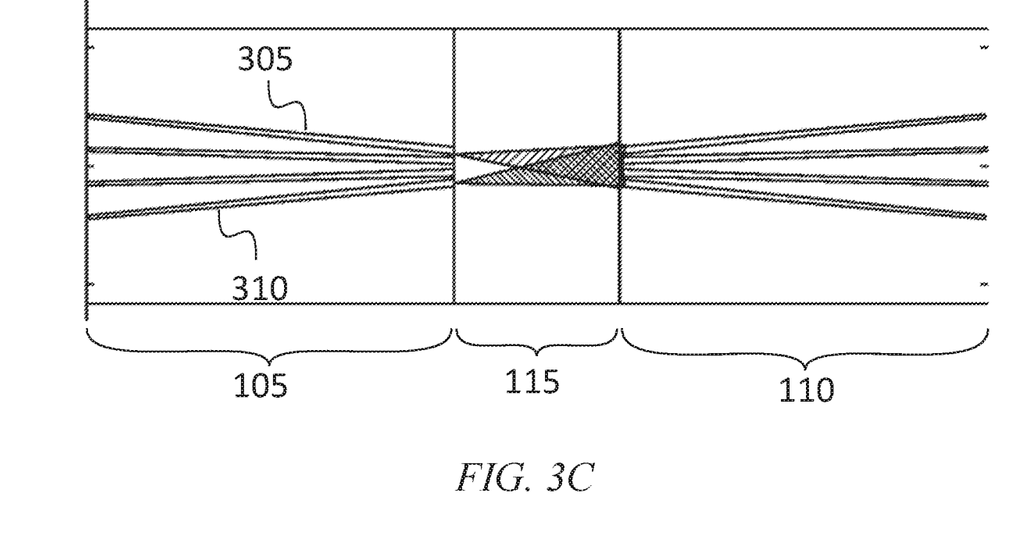
FIG. 3C is a schematic drawing of a star coupler, according to an embodiment of the present disclosure.

FIGS. 3A and 3B illustrate, like FIGS. 1A and 1B, the larger divergence angle that may occur with light of a longer wavelength. Referring to FIG. 3C, in one embodiment the waveguide widths are adjusted to reduce the wavelength-dependence of the divergence angle. For example, the star coupler of FIG. 3C may be part of a system (e.g., part of an AWG) in which each of the first waveguides carries primarily light of a particular respective wavelength or wavelength range. In such a case, the width of each such waveguide (at the transition between the waveguide and the free propagation region 115) may be selected (e.g., made wider for longer wavelengths and narrower for shorter wavelengths) so that the divergence angles corresponding to the different wavelengths are more nearly the same. In some embodiments the widths are selected so that the divergence angles are all substantially the same. For example, as indicated in FIG. 3C, a first one 305 of the first waveguides 105 carries light with a wavelength of about 1500 nm and a second one 310 of the first waveguides 105 carries light with a wavelength of about 2500 nm, and the second one 310 of the first waveguides is made wider than the first one 305 of the first waveguides, so that the divergence angles of the respective beams exiting these two waveguides are about the same. FIG. 3C is a schematic illustration in which the differences in the widths of the waveguides are not shown.

In some embodiments, the divergence angles are chosen such that most of the power in the field pattern, e.g., 99% of the power (or 99.7% of the power, or 99.9% of the power), is within a range of angles subtended by the array of second waveguides 110 (or by the "second aperture", as discussed in further detail below). Such a beam may be said to have a 99% full width (Theta_99) (or a 99.7% full width (Theta_99.7), or a 99.9% full width (Theta_99.9)) equal to the angle subtended by the second aperture. For example, in one embodiment, in which the second waveguides subtend an angle of 13.8 degrees, a waveguide carrying light with a wavelength of about 1500 nm has a width of 4.5 microns, and a waveguide carrying light with a wavelength of about 2500 nm has a width of 7 microns, so that both of the field patterns produced by the two waveguides have a 99% full width of 13.8 degrees. The divergence angle may be polarization dependent (i.e., it may be different for the two fundamental modes, the fundamental TE mode and the fundamental TM mode). In an application in which, in operation, only one polarization is expected to be present, each waveguide width may be selected to produce a field pattern with a suitable divergence angle for that polarization. In an application in which, in operation, both polarizations are expected to be present, the width of each waveguide may be selected to have a value between (i) the width for which the fundamental TE mode field pattern has the design divergence angle and (ii) the width for which the fundamental TM mode field pattern has the design divergence angle.

Figure 4A:
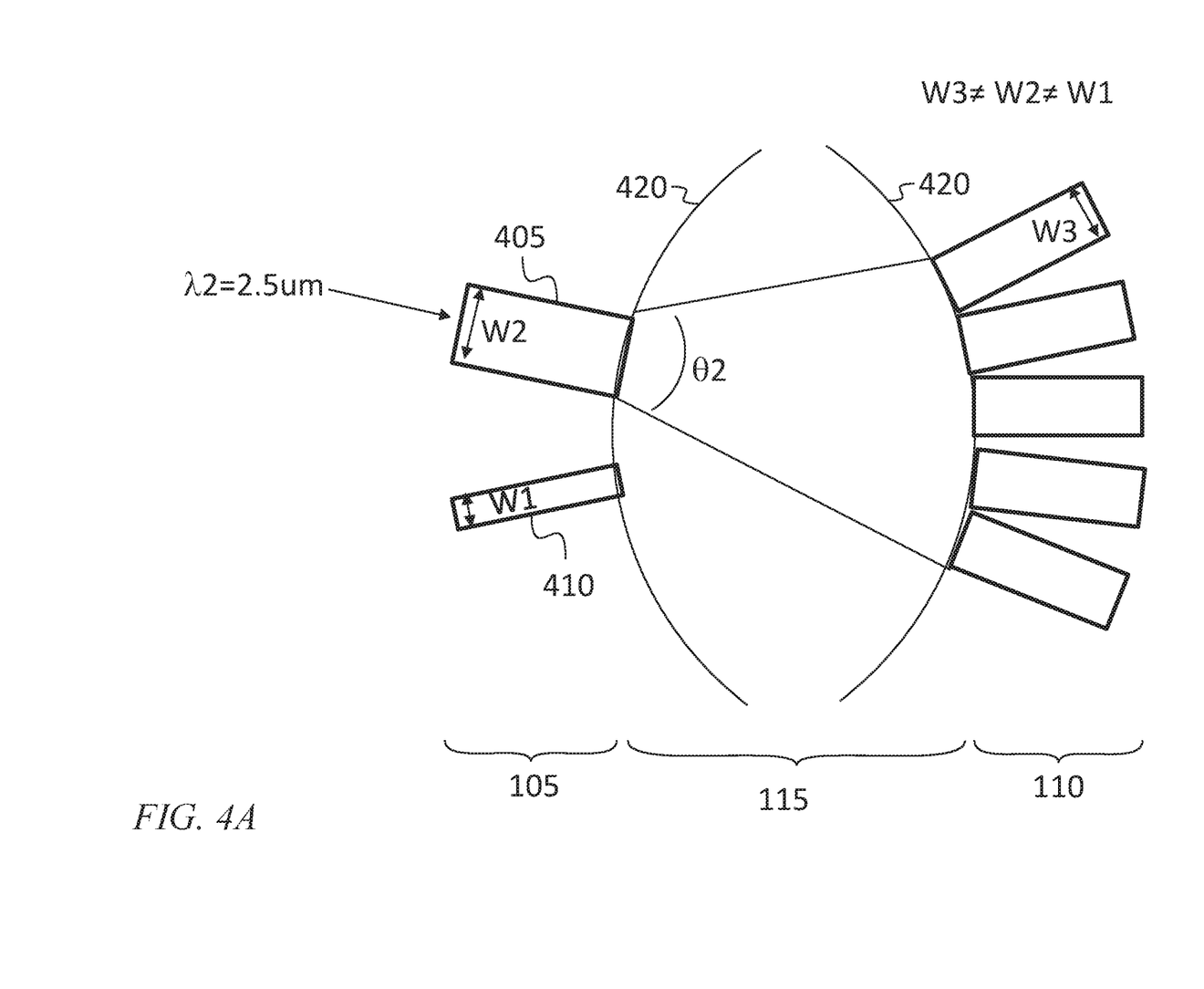
FIG. 4A is a schematic drawing of a star coupler, according to an embodiment of the present disclosure.
Figure 4B:
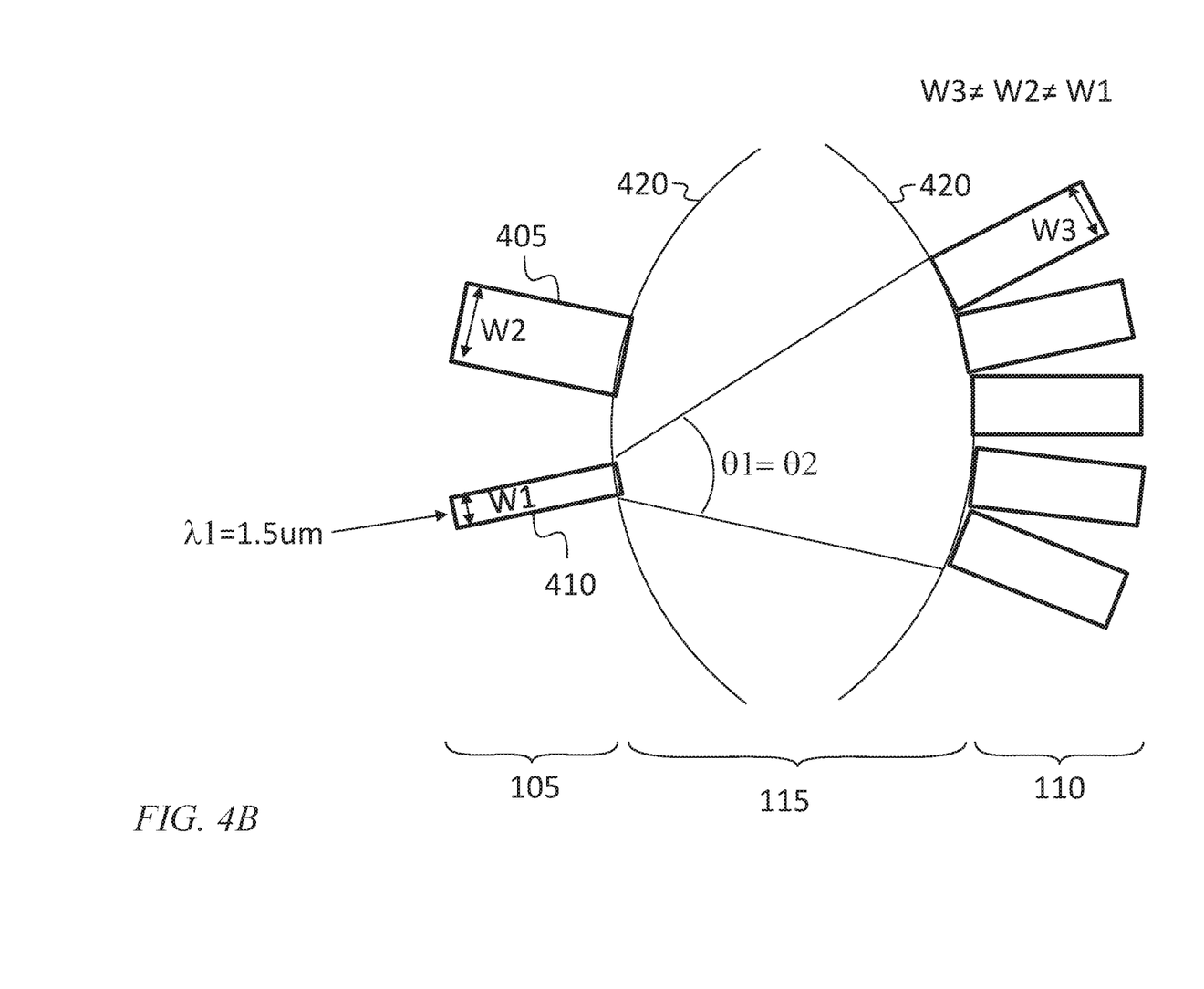
FIG. 4B is a schematic drawing of a star coupler, according to an embodiment of the present disclosure.
Figure 4C:
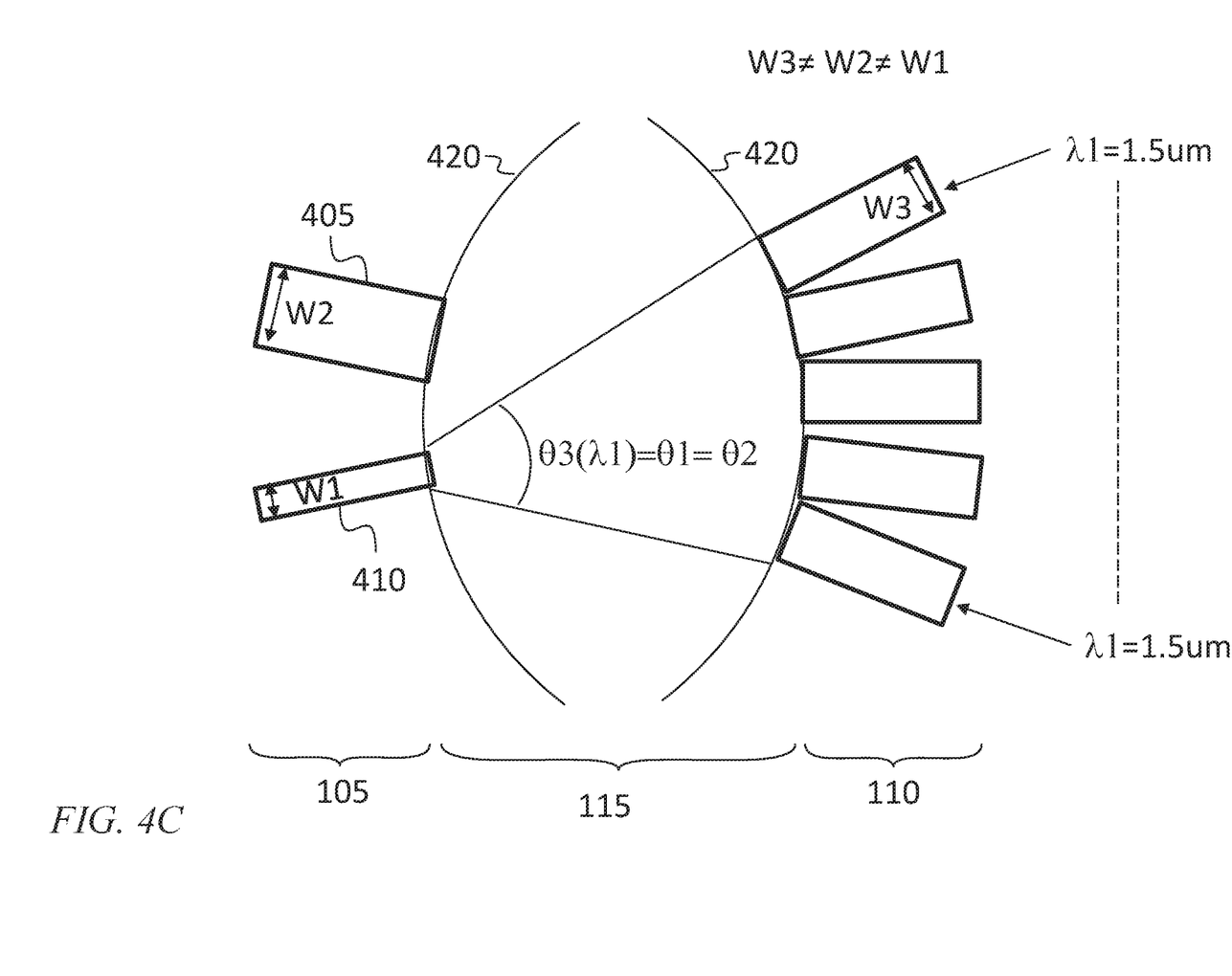
FIG. 4C is a schematic drawing of a star coupler, according to an embodiment of the present disclosure.
Figure 4D:
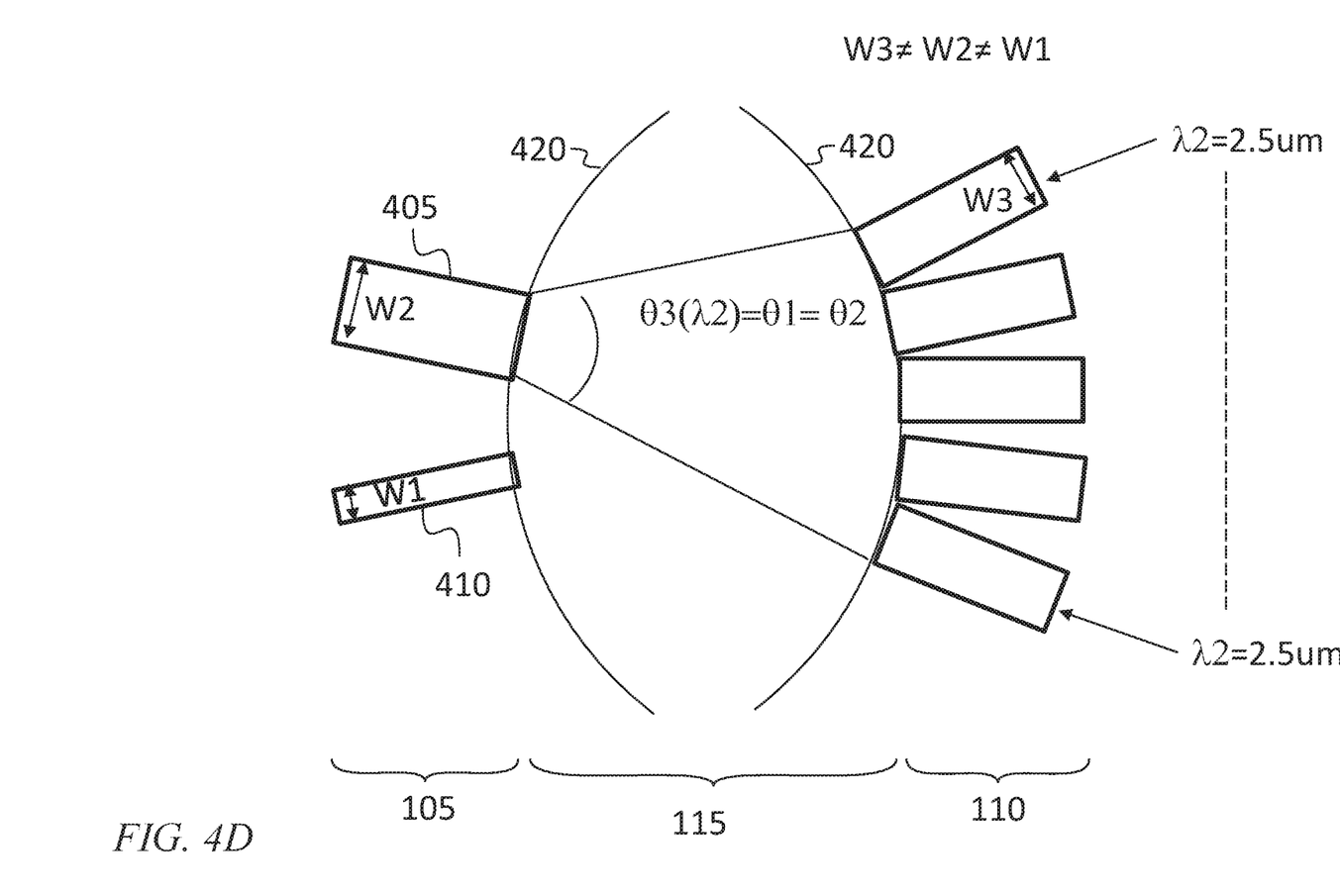
FIG. 4D is a schematic drawing of a star coupler, according to an embodiment of the present disclosure.

Referring to FIGS. 4A-4D, in some embodiments the waveguides on one side of the star coupler (e.g., those on the left of FIGS. 4A-4D, identified in FIGS. 4A-4D as the first waveguides 105) have widths that vary according to the intended wavelength of operation, and all of the waveguides on the other side of the star coupler (e.g., those on the right of FIGS. 4A-4D, identified in FIGS. 4A-4D as the second waveguides 110) have the same width. Referring to FIG. 4A, in operation, when light (e.g., light at 2500 nm) enters the star coupler through a first one 405 of the first waveguides 105, it diverges in the free propagation region 115 with a divergence angle θ2. When, as shown in FIG. 4B, light (e.g., light at 1500 nm) enters the star coupler through a second one 410 of the first waveguides 105, it diverges in the free propagation region 115 with a divergence angle θ1. In spite of this wavelength being shorter than that of FIG. 4A, because the second one 410 of the first waveguides 105 is narrower than the first one 405 of the first waveguides 105, the divergence angle θ1 may be the same as the divergence angle θ2. Referring to FIG. 4C, when light at 1500 nm enters all of the second waveguides 110 with suitable relative phases, it converges on the second one 410 of the first waveguides 105, and, referring to FIG. 4D, when light at 2500 nm enters all of the second waveguides 110 with suitable relative phases, it converges on the first one 405 of the first waveguides 105. The surface at which the first waveguides 105 (including any dummy waveguides) abut the free propagation region 115 may be referred to as a "first aperture" or "first interface" of the star coupler, and the surface at which the second waveguides 110 (including any dummy waveguides) abut the free propagation region 115 may be referred to as a "second aperture" or "second interface" of the star coupler. The ends of the waveguides at the respective first and second apertures are illustrated for convenience as being rectangular although in some embodiments the free propagation region has the same height as the ribs of the waveguides (discussed in further detail below) so that, contrary to the view shown in the schematic representation of FIGS. 4A-4D, there may be no visible line separating the waveguides from the free propagation region 115, and the boundary may instead be defined by the Rowland circle mount 420 at the aperture and by the ends of the trenches 610 (FIG. 6A) between adjacent waveguides.

It will be understood that in the Fraunhofer approximation the divergence angle is proportional to the ratio of the wavelength and the width of the optical mode exiting the waveguide; accordingly, designing each waveguide to have a width proportional to the wavelength of the light it will carry may result in substantially equal divergence angles. For various reasons this approximation may not be exact. A more precise analysis may be performed numerically, by representing the light exiting a transmitting waveguide as a superposition of plane waves and calculating the fields that result at the receiving waveguides as sum of the plane wave fields. Such a numerical analysis may be performed using various commercially available software packages available, for example, from Photon Design (photond.com) or from Lumerical (www.lumerical.com).

Figure 5A:
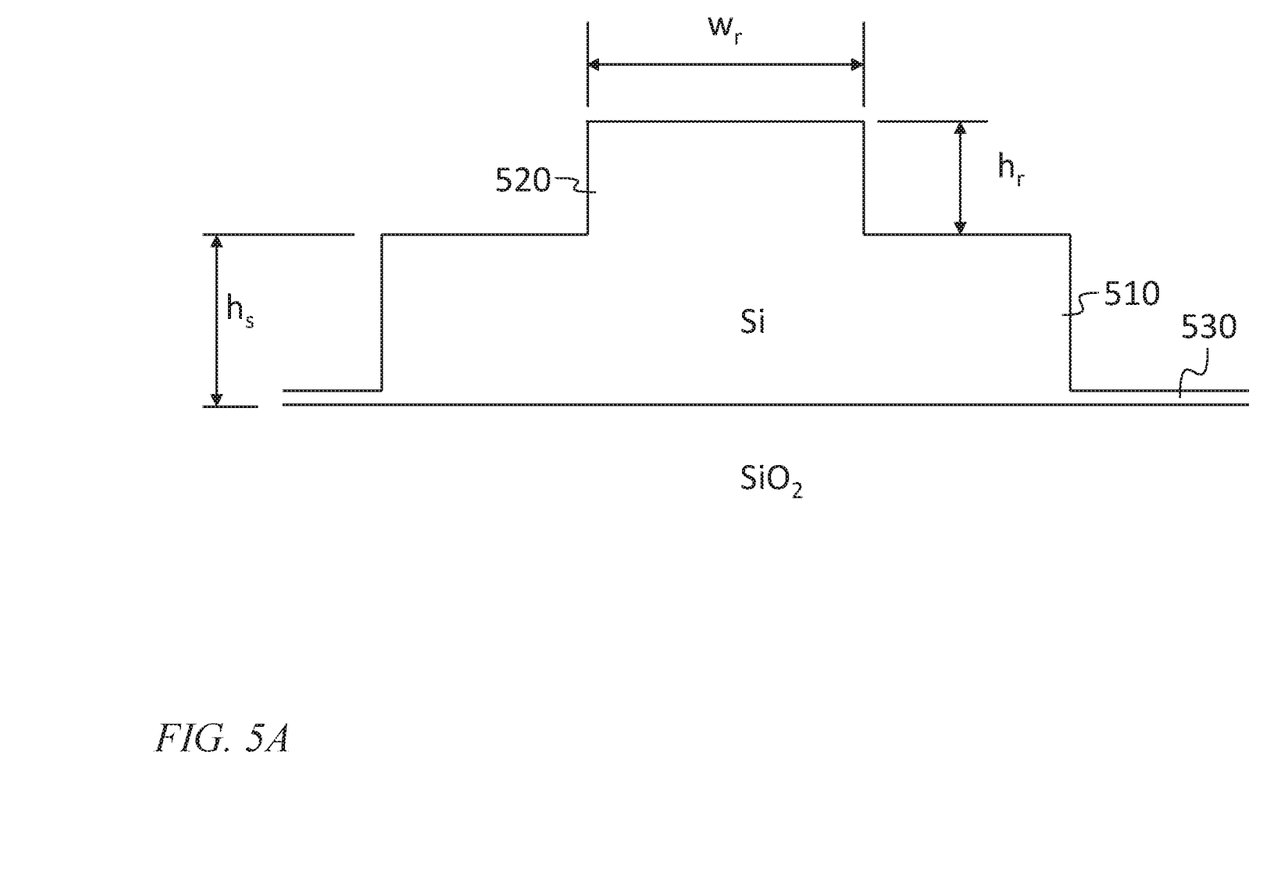
FIG. 5A is a schematic cross sectional view of a rib waveguide, according to an embodiment of the present disclosure.
Figure 5B:
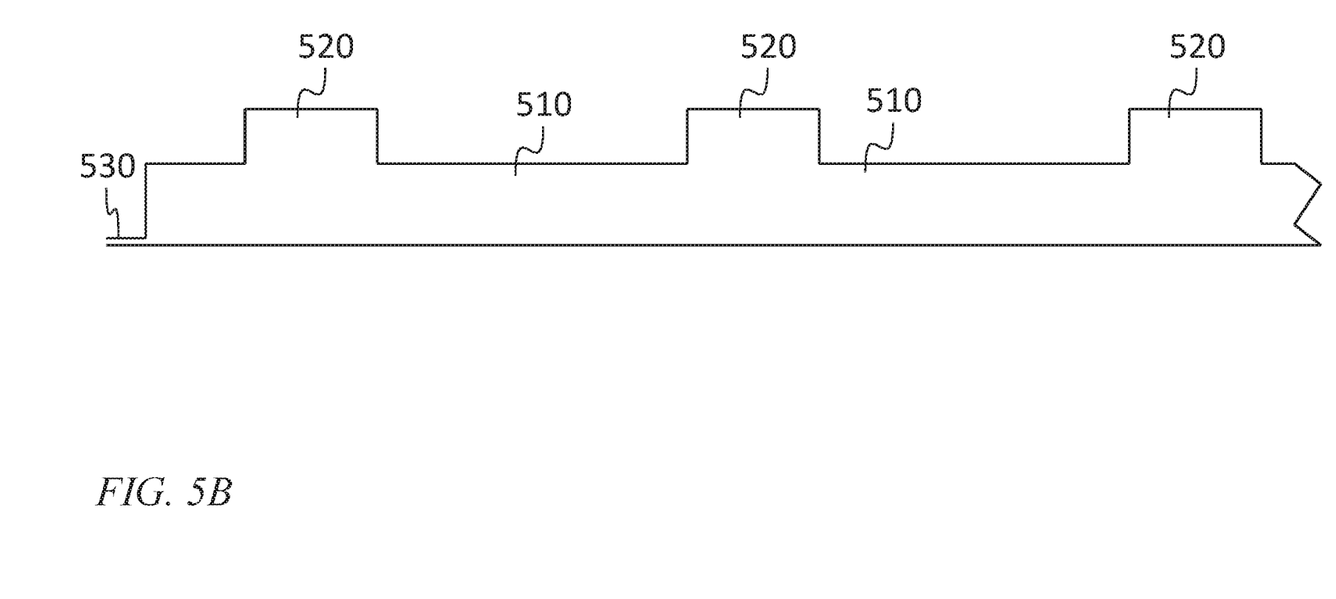
FIG. 5B is a schematic cross sectional view of a plurality of rib waveguides, according to an embodiment of the present disclosure.

In some embodiments, each of the waveguides at each aperture of the star coupler is a rib waveguide. Referring to FIG. 5A, the waveguide may be fabricated as a silicon on insulator (SOI) structure, in which a layer of silicon (Si) 3 microns thick, on a layer of silicon dioxide ($SiO_2$) (which may be referred to as "buried oxide" or "BOX" layer) is etched to form a slab portion 510 and a rib portion 520 extending above the slab portion 510. In one embodiment, the width $w_r$ of the rib is 3.0 microns, the height $h_r$ of the rib is 1.2 microns, and the height $h_s$ of the slab is 1.8 microns. A thin (e.g., 0.2 micron thick) layer 530 of silicon may remain on the silicon dioxide in regions on both sides of the slab, for fabrication purposes; this layer may have a negligible effect on the optical characteristics of the waveguide. Adjacent waveguides may share a slab portion 510 (as shown in FIG. 5B).

Figure 6A:
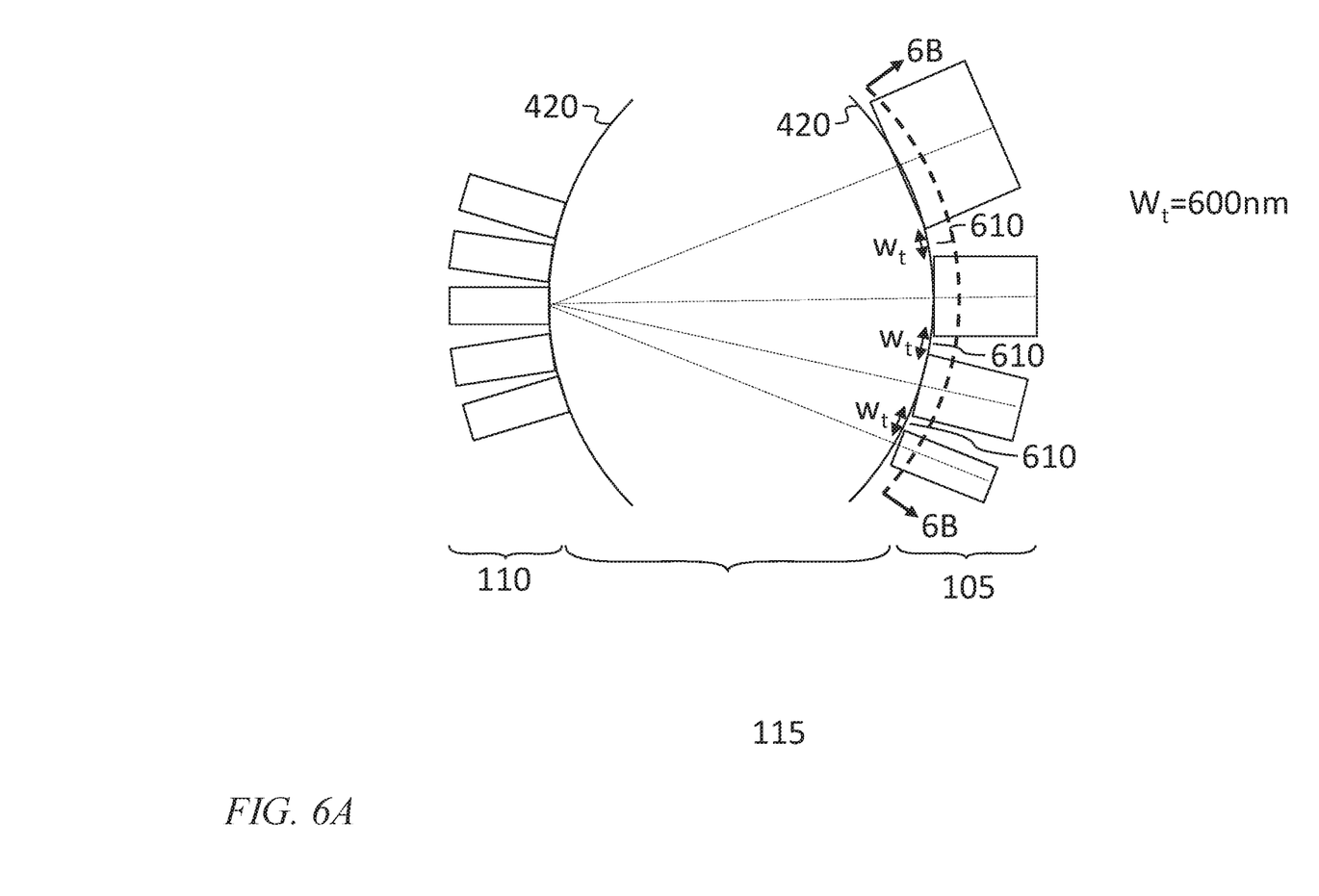
FIG. 6A is a schematic drawing of a star coupler, according to an embodiment of the present disclosure.
Figure 6B:
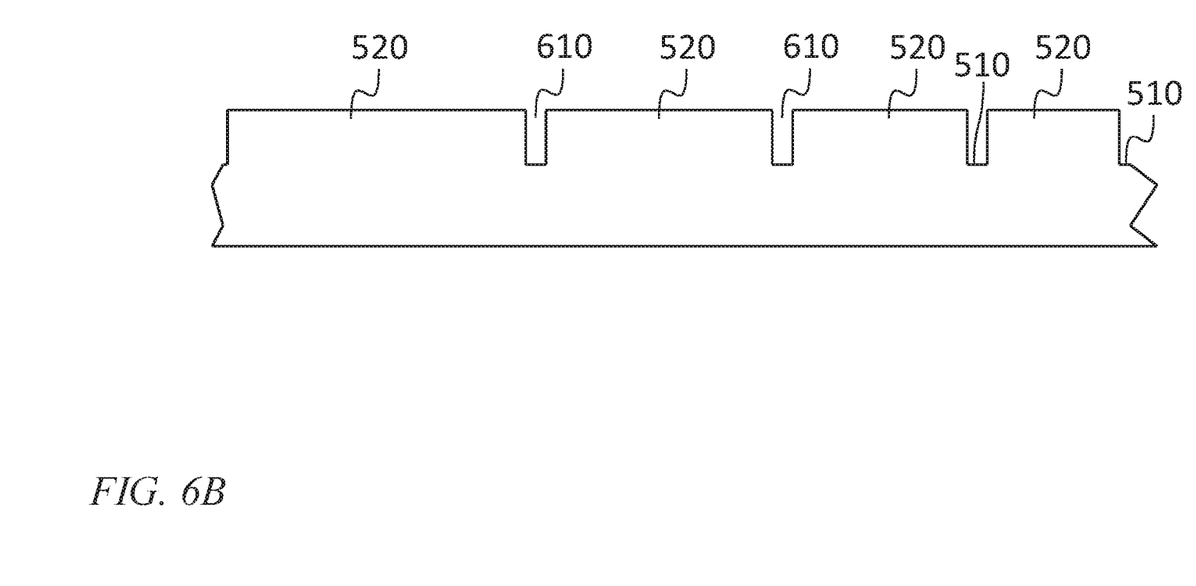
FIG. 6B is a schematic cross sectional view of a plurality of rib waveguides, taken along section line 6B-6B of FIG. 6A, according to an embodiment of the present disclosure.

Referring to FIG. 6A, in some embodiments the trenches 610 between adjacent waveguides are made as narrow as possible, so that the first waveguides 105 are as wide as possible without interfering with each other. For example, each trench may be made as narrow as the limits of the fabrication process permit, e.g., narrower than 1 micron or narrower than 700 nm (e.g., 600 nm). In such an embodiment the relatively large width of each of the first waveguides 105 may result in an increase in peak channel insertion loss, but may also result in a broader passband response in each channel of an AWG using such a star coupler. The broader passband response may be advantageous in an AWG (e.g., an N×1 AWG) configured for use as a multiplexer. FIG. 6B is a schematic cross sectional view of a plurality of rib waveguides, taken along section line 6B-6B of FIG. 6A.

In some embodiments, the widths are selected by identifying the position on the first aperture at which each of the first waveguides is centered, (corresponding to a design center wavelength for that waveguide). The width of a first one of the first waveguides, e.g., a waveguide at one end of the first aperture, may then be selected to have a certain nominal value, e.g., 3 microns. Each subsequent waveguide along the first aperture is then widened (or narrowed) until the width of the trench 610 between it and the preceding waveguide is suitable (e.g., equal to the minimum width the fabrication process is capable of producing, e.g., 600 nm). In some embodiments, if this process results in some of the other waveguides being too narrow or too wide, the process may be repeated using a different width (e.g., a narrower width, or a wider width, respectively) for the first one of the first waveguides.

Figure 7A:
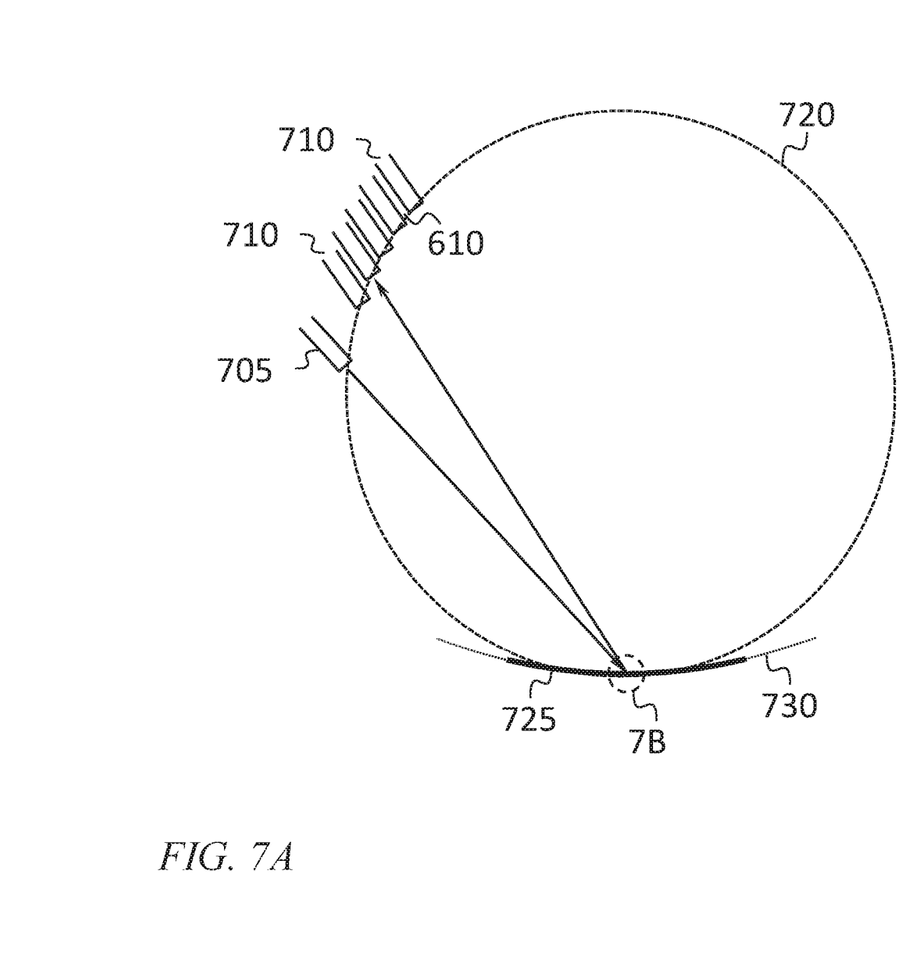
FIG. 7A is a drawing of an echelle grating, according to an embodiment of the present invention.
Figure 7B:
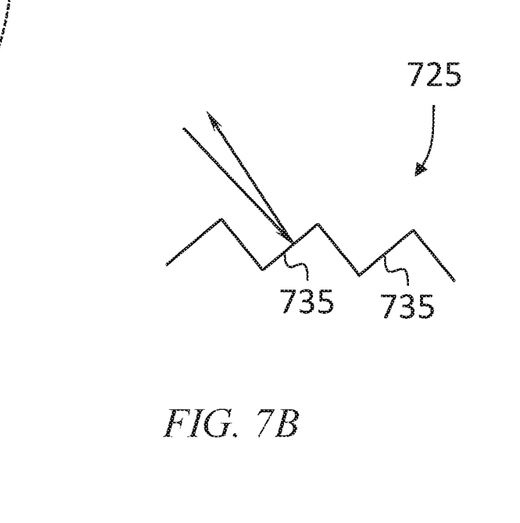
FIG. 7B is an enlarged view of portion 7B of FIG. 7A, according to an embodiment of the present invention.

Referring to FIG. 7A, an echelle grating is another example of a wavelength-selective element, that may be formed with an input waveguide 705, and with a plurality of output waveguides 710, each of which is a waveguide ending at a boundary with a slab region 715, the boundary being on a Rowland circle. The grating may be formed along a grating curve 730 which may be a portion of a circle having twice the radius of the Rowland circle and being tangent to the Rowland circle within a region of the grating curve illuminated by light from the input waveguide 705. The grating 725 may include a series of reflective facets 735 as illustrated in the enlarged view of FIG. 7B. The widths of the output waveguides 710 may be selected using a process analogous to those described above for a star coupler, e.g., the width of each may be selected to be proportional, or approximately proportional, to a corresponding wavelength, or it may be selected so that most of the power in the field pattern, corresponding to a fundamental mode of the output waveguide, at the grating 725 (e.g., 99.7% of the power or 99.9% of the power) is within the range of angles subtended, at the output waveguide, by the grating 725, or it may be selected to result in trenches 610 between adjacent output waveguides 710 that are as narrow as the limits of the fabrication process permit.

As used herein, the terms "optical system", "optical device" and "optical element" are synonymous and refer to a thing having optical inputs and optical outputs. These terms may be used in combination to describe, for example, an optical system including a plurality of optical elements, or an optical system including an optical device and one or more other optical elements.

In some of the descriptions herein optical elements are described for convenience as having "input waveguides" and "output waveguides". It will be understood, however, that the star couplers, AWGs, and echelle gratings described herein may be reciprocal devices, and, as such, any waveguide described as an "output" may be used as an input. For example, an AWG may be a reciprocal device, e.g., for light traveling in one direction through the AWG it may behave as a wavelength division multiplexing (WDM) multiplexer, and for light traveling in the opposite direction, it may behave as a WDM demultiplexer. Accordingly, each input waveguide and each output waveguide of an optical element may be referred to more generally as a "port" waveguide.

Although exemplary embodiments of a broadband star coupler have been specifically described and illustrated herein, many modifications and variations will be apparent to those skilled in the art. Accordingly, it is to be understood that a broadband star coupler constructed according to principles of this disclosure may be embodied other than as specifically described herein. The invention is also defined in the following claims, and equivalents thereof.

What is claimed is:

1. An echelle grating, comprising:
   a first interface;
   a second interface;
   a plurality of output waveguides, at the first interface;
   one or more input waveguides, at the second interface; and
   a free propagation region connecting the plurality of output waveguides and the one or more input waveguides,
   a first waveguide, of the plurality of output waveguides, having a first width,
   a second waveguide, of the plurality of output waveguides, having a second width,
   the first width being at least 5% greater than the second width,
   the echelle grating being configured:
      when light is received at a first wavelength in only a third waveguide, of the one or more input waveguides, to direct the light at the first wavelength to the first waveguide; and
      when light is received at a second wavelength in only the third waveguide, to direct the light at the second wavelength to the second waveguide, and
   a ratio of the first width to the second width being within 10% of a ratio of the first wavelength to the second wavelength.

2. The echelle grating of claim 1, wherein a trench between the first waveguide and a waveguide, of the plurality of output waveguides, adjacent to the first waveguide has a width less than 1 micron.

3. The echelle grating of claim 2, wherein the width of the trench is less than 700 nm.

4. The echelle grating of claim 2, wherein each trench between a pair of adjacent waveguides of the plurality of output waveguides has a width less than 1 micron.

5. The echelle grating of claim 4, wherein each trench between a pair of adjacent waveguides of the plurality of output waveguides has a width less than 700 nm.

6. An echelle grating, comprising:
   a first interface;
   a second interface;
   a plurality of output waveguides, at the first interface;
   one or more input waveguides, at the second interface; and
   a free propagation region connecting the plurality of output waveguides and the one or more input waveguides,
   a first waveguide, of the plurality of output waveguides, having a first width,
   a second waveguide, of the plurality of output waveguides, having a second width,
   the first width being at least 5% greater than the second width,
   the echelle grating being configured:
      when light is received at a first wavelength in only a third waveguide, of the one or more input waveguides, to direct the light at the first wavelength to the first waveguide; and
      when light is received at a second wavelength in only the third waveguide, to direct the light at the second wavelength to the second waveguide, and
   a ratio of the first width to the second width being within 10% of a ratio of the first wavelength to the second wavelength
   the first width being selected such that a first field pattern, at a grating of the echelle grating, corresponding to a fundamental mode of the first waveguide, includes, within a range of angles subtended by the grating of the echelle grating, at least 99% of the power of the first field pattern.

7. The echelle grating of claim 6, wherein the second width is selected such that a second field pattern, at the grating of the echelle grating, corresponding to a fundamental mode of the second waveguide, includes, within a range of angles subtended by the grating of the echelle grating, at least 99% of the power of the second field pattern.

* * * * *